United States Patent [19]

Ohkuma et al.

[11] Patent Number: 5,344,824
[45] Date of Patent: Sep. 6, 1994

[54] METHOD FOR REDUCING INSULIN SECRETION

[75] Inventors: Kazuhiro Ohkuma; Shigeru Wakabayashi, both of Sanda; Yoshimi Mochizuki, Itami; Mitsuko Satouchi, Takarazuka, all of Japan

[73] Assignee: Matsutani Chemical Industries Co., Ltd., Hyogo, Japan

[21] Appl. No.: 933,909

[22] Filed: Aug. 27, 1992

Related U.S. Application Data

[63] Continuation of Ser. No. 803,760, Dec. 5, 1991, abandoned, which is a continuation of Ser. No. 656,534, Feb. 19, 1991, abandoned.

[30] Foreign Application Priority Data

Feb. 2, 1990 [JP] Japan .................................. 2-40384

[51] Int. Cl.$^5$ .............................................. A61K 31/70
[52] U.S. Cl. ...................................... 514/58; 514/866; 424/439; 536/103; 435/101
[58] Field of Search ................... 514/58, 866; 536/103; 424/439

[56] References Cited

U.S. PATENT DOCUMENTS

3,928,135 12/1975 Milner .................................. 536/1.1

FOREIGN PATENT DOCUMENTS

0368451 5/1990 European Pat. Off. .

OTHER PUBLICATIONS

950048c, Chemical Abstrcts, vol. 109, No. 12, Sep. 19, 1988, p. 99.
152572m, Chemical Abstracts, vol. 111, No. 17, Oct. 23, 1989, p. 607.
122401f, Chemical Abstracts, vol. 91, No. 15, Oct. 8, 1979.
Database Biosis AN80: 129661, Biochemical Abstracts, Philadelphia, US, J. J. Albrink et al, "Effect of High Figer and Lower Figer Diets on Plasma Lipids and Insulin" & Am. J. Clin. Nutr. 1979, vol. 32, No. 7, pp. 1486–1491.

Primary Examiner—Ronald W. Griffin
Attorney, Agent, or Firm—Sughrue, Mion, Zinn, Macpeak & Seas

[57] ABSTRACT

A food composite for saving insulin secretion comprising a refined product of pyrodextrin obtained as an active ingredient through a process of decomposing starch or starch hydrolyzate by heating in the presence of an acid or without acid.

11 Claims, 3 Drawing Sheets

METHOD FOR REDUCING INSULIN SECRETION

This application is a continuation of application Ser. No. 07/803,760 filed Dec. 5, 1991 (now abandoned), which is a continuation of Ser. No. 07/656,534, filed Feb. 19, 1991 (now abandoned).

BACKGROUND OF THE INVENTION

1. Field of the Invention

The present invention relates to a food composite capable of performing an action of reducing insulin secretion without influence on blood glucose level.

2. Description of Prior Art

Increase of blood glucose after eating meals results in secretion of insulin. Because of recent progress in food refining processes and a preference for favorite taste, there is a tendency for the people in European and American countries to take in much sugar and fat. Thus, the rate of occurrence of non-infectious diseases such as obesity, diabetes, arteriosclerosis is now extremely high due to excessive intake of nutrition and resultant excessive secretion of insulin. Also in Japan, there is a recent trend that the rate of occurrence of the aforementioned diseases has sharply increased with the westernization in meals.

Hitherto, several materials acting on the autonomous nervous system have been well known. For example, as a stimulant for α-receptor in sympathetic nerves such materials as epinephirine, norepinephirine have been well known for performing a function of inhibiting insulin secretion. And as an interceptor for α-receptor in the sympathetic nerve, such materials as propanol and dopaserotonin have been well known for performing the same function.

Other than the foregoing, sugar metabolism inhibition materials such as 2-deoxyglucose and mannoheptulose, somatostatin and Ca2 antagonist also perform the function of inhibiting insulin secretion.

A problem, however, exists in that most of these materials, belonging to a group of powerful medicines specified in the Japanese "Drugs Cosmetics and Medical Instruments Law", are prohibited to be employed as food additives.

Furthermore, it has been generally said that water-soluble dietary fibers typically represented by guar gum and pectin are useful for saving insulin secretion because of inhibition of an increase of blood glucose. It is, however, also said that these fibers have a disadvantage of giving negative effects on adsorption of useful metals due to their high viscosity. Such high viscosity brings about a further disadvantage of making it difficult to intake them in a large quantity and, as a result, uses of these fibers are quite limited.

As noted above, westernization and diversification of meals have taken place also in Japan increasingly. Paticularly, with the improvement in refining techniques of foods, occurrence of non-infectious diseases such as obesity, diabetes, and arteriosclerosis have been increasing due to excessive intake of nutrition, in particular, due to disorder in sugar metabolism caused thereby. In the prior art, materials performing an effect of lowering blood glucose such as various polysaccharides including guar gum, a devil's-tongue mannan, and alpha-glucosidase inhibitor have been conventionally employed for the purpose of prevention and remedy of the aforementioned diseases. On the other hand, it is known to those skilled in the art that the increment of insulin secretion is in proportion to the amount of increase in blood glucose value per unit time in the early stage, while being in proportion to the total amount of sugar content ingested in the late stage. Further, the blood glucose value after ingestion, particularly the highest blood sugar value is not always correlated with the amount of sugar content ingested. Furthermore, it has been recognized that change in blood glucose value is one of the important factors to determine the start and finish of a meal and deeply related to the adjustment of every meal amount in rather short time.

When considering the aforesaid knowledges, reduction in insulin secretion without affecting on the blood glucose level, in other words, without disturbing the physiology of eating behavior, is very significant not only for the prevention of obesity, and inhibition of transition from the pre-stage of diabetes to the obvious diabetes, but also for the inhibition of fat build-up caused by insulin in arteriosclerosis. Moreover, desired to exhibit/certain useful effects for the prevention from the diseases in general in such a manner as to reduce harmful actions brought about by insulin. From the mentioned quite novel point of view, the inventors have come to conceive an idea of developing a material capable of performing an advantage reducing the insulin secretion without negatively affecting the blood glucose level in both human and animal bodies.

On the basis of such a new concept, the inventors have further come to an attempt of materializing the novel idea in order to assure the advantage of reducing the mentioned insulin secretion utilizing pyrodextrin that has hardly been considered as food material, thus developing a food composite performing the mentioned effect.

SUMMARY OF THE INVENTION

Accordingly, an object of the present invention is to materialize an idea as mentioned above, in other words, to develop a food composite from pyrodextrin on the basis of the mentioned idea, the food composite being capable of performing an action of reducing insulin secretion without a undesirable influence on blood glucose value.

The foregoing object of the invention is accomplished by employing a refined product of pyrodextrin that can be obtained through a process wherein starch or starch hydrolyzate is decomposed by heating in the presence of an acid or without an acid, the mentioned refined pyrodextrin serving as a main composition of food composites performing an advantage of reducing the insulin secretion.

As mentioned above, the invention is based on a concept that the refined pyrodextrin obtained through the process of decomposing at least one of starch or starch hydrolyzate exhibits an extremely remarkable action of reducing insulin secretion without affecting the blood glucose value.

Described now is a process for preparing pyrodextrin in accordance with the invention.

As for a raw starch, that is, a starch to be employed in embodying the invention, a wide range of starches such as potato, corn, and cassaba can be utilized. It is also preferable to employ those starches in the form of processed food commercially available in the market. In this case, enumerated as processed starches are, for example, soluble starch, esterified starch, etherized starch, cross-linked starch and, preferably, starch phosphate and hydroxypropyl starch.

These raw materials in accordance with the invention are decomposed by heating, preferably, under normal pressure. The decomposition by heating is achieved by heating the materials at a temperature from about 130° C. to 220° C. for 1 to 5 hours. The pressure at the heating may be the normal one without necessity of either being under vacuum or pressure. At this heating step, it is also preferable to add an acid as a catalyst for decomposition by heating. As the acid to be adopted as the catalyst, mineral acids such as sulfuric acid, hydrochloric acid and nitric acid can be used, and in particular, hydrochloric acid is preferable when added in an amount of several % by weight to the materials to have a concentration of 1% by weight. The acid should be added evenly, being, preferably, well mixed by spraying. The mixture is then preferably dried up preliminarily at a temperature from about 100° C. to 120° C. so as to reduce the moisture to about 5%.

The dextrin in accordance with the invention obtained in the above-mentioned process, that is, pyrodextrin is then subject to refining. The refining process is now described hereunder:

At least one treatment of (a) and (b) is employed:
(a) After a hydrolysis with α-amylase, or after a hydrolysis with glucoamylase following the hydrolysis with α-amylase, the solution is refined through known processes of filtration, decolorization, and deionization.
(b) After completing of the treatment (a), a further treatment separates the dextrin fraction with chromatography by ion-exchanger resins.

Further description on the treatments (a) and (b) is given in detail as follows:

In the treatment (a), pyrodextrins are dissolved in water to obtain a solution of 30% to 50% by weight, and then neutralized to pH 5.5 to 6.5, preferably to pH 5.8, and 0.05% to 0.2% by weight of α-amylase (available in the market, either the one originated from mold or the one from bacteria may be applied) based on the pyrodextrin is added to the solution, and then at the reaction temperature of said amylase in the range from about 85° C. to 100° C., the solution is hold for 30 minutes to 2 hours. Subsequently, the temperature of the solution is raised up to 120° C. to complete the reaction of α-amylase. Thereafter, the temperature of the solution is decreased to about 55° C., and the solution is adjusted to about pH 5.5, then 0.05% to 0.2% by weight of glucoamylase (popularly used) based on the original dextrin is added. The solution is kept at a temperature to allow its reaction for 24 to 48 hours. This reaction aims at decomposition of small molecules such as oligosaccharides into glucose. Following this step, temperature of the solution is raised up to, for example, about 80° C. to complete the action of glucoamylase.

On the other hand, in the treatment (b), chromatographic separation by ion-exchange resin is carried out. In this treatment, strongly acidic ion exchange resins sold widely on the-market can be employed.

Preferable as concrete examples are Amberlite IR-116, IR-118, IR-120B, XT-1022E, XT-471F (all manufactured by Organo), Daion SK-1B, SK-102, SK-104, SK-106, SK-110, SK-112, SK-116, FR-01 (all manufactured by Mitsubishi Chemicals), and XFS-43281.00, XFS-43280.00, XFS-43279.00, XFS-43278-00 (all manufactured by Dow Chemicals).

These resins are preferably dealt with as alkaline metal type or alkaline earth metal type before their uses. It is preferable to adjust the rate of flow at the time of a column fluid according to a resin to be used. The rate of flow of the fluid is preferably in the range of SV=0.1 to 0.6. The rate of flow out of the above range tends to deteriorate the workability and separation. The temperature at the time of running the fluid is preferably in the range from 20° C. to 70° C., and a temperature below this range will deteriorate the separation and make the viscosity of fluid too high, thereby giving a negative influence on the fluid, while a temperature exceeding this range will cause the fluid to be tanned and deteriorate other quality characteristics.

When observing carefully the dextrin refined from the mentioned pyrodextrin, it was recognized that their linkages were not only 1→4 and 1→6 bonds with glucose as structural sugar, but also 1→2 and 1→3 bonds. Further, a part of reducing end group is of 1-6-anhydroglucose.

Viscosity of this pyrodextrin is rather low, i.e., about 10 cps (30%, 30° C.), and it tastes slightly sweet and is orderless, with the number of 1→2 and 1→3 bonds below about 10%. The pyrodextrin is, therefore, easily employed as a material for various beverages and processed foods and, furthermore, it is as safe to be eaten as maltodextrin since its raw material is starch.

In this manner, the pyrodextrin serving as the above food material in accordance with the invention can be widely used as a material for various foods, and its uses extend to any food so far as it is used as a material for food. Typical foods in this sense are, for example, beverages, desserts and candies.

Other objects, features and advantages of the invention will become apparent in the course of the following description accompanied by the drawings.

DESCRIPTION OF THE PREFERRED EMBODIMENTS

Several examples in accordance with the present invention is hereinafter described in more detail.

Figure 1A:
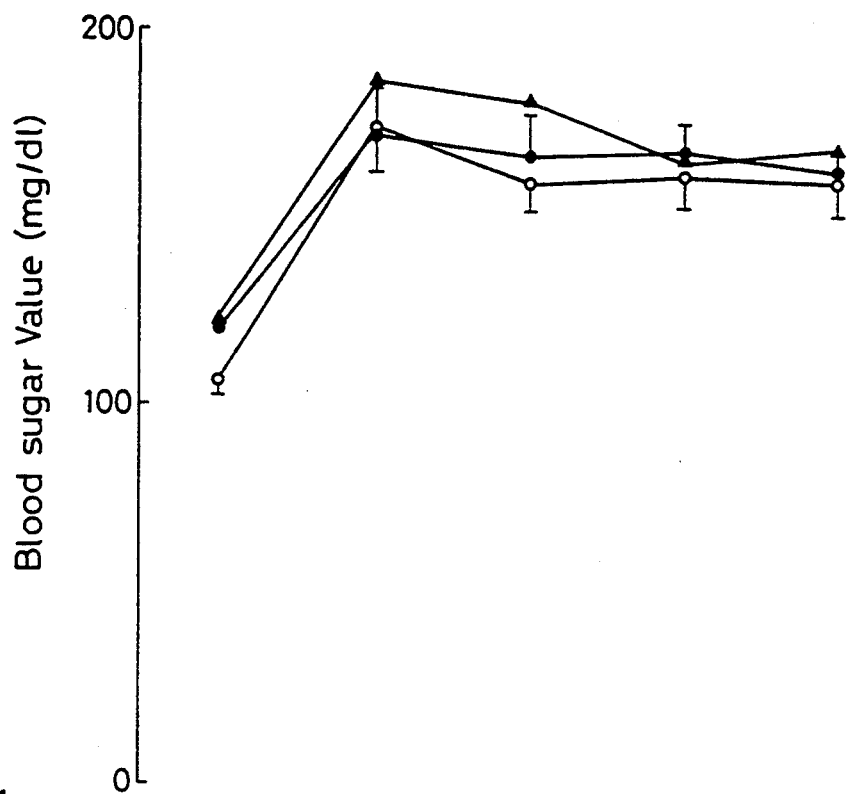
FIG. 1(a) is a graph showing the results of measuring blood glucose values.
Figure 1B:
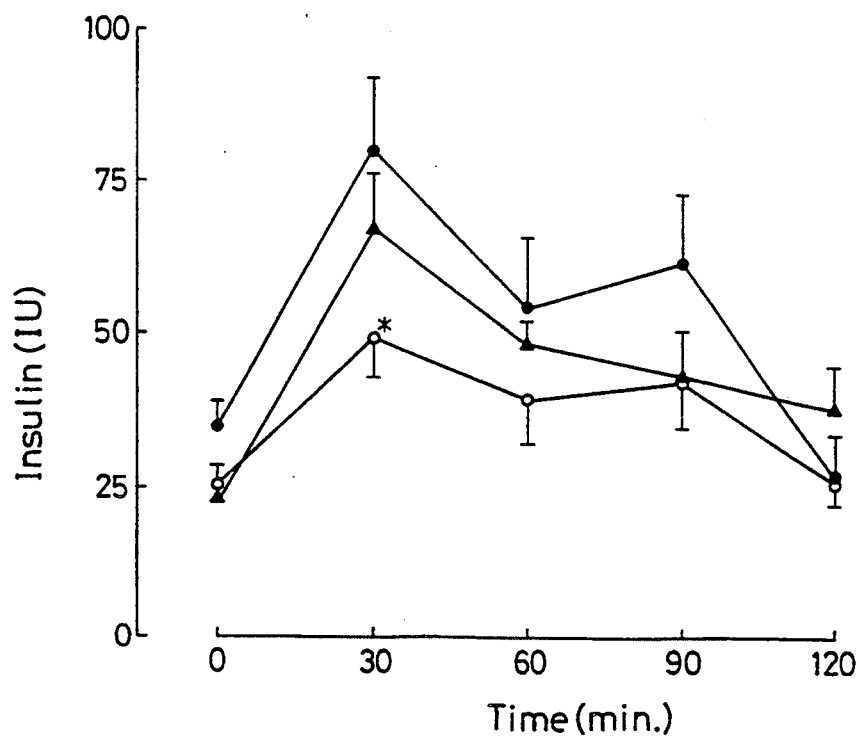
FIG. 1(b) is a graph showing the results of measuring insulin values.

EXAMPLE 1:

8-week-old male rats of SD descent weighing 234 g to 44g were employed as samples. After those rats have been subjected to a fast for about 20 hours, three kinds of solution, namely, a solution of glucose alone (1.5 g/kg weight), a solution of glucose (1.5 g/kg weight) and PF-C (0.6 g/kg weight) were given orally to them, then blood was collected from the samples with the lapse of time, and the blood glucose level thereof was measured by an enzyme method, while insulin value was measured by RIA method. Each administrative test was carried out at one-week intervals. The results are shown in FIG. 1, wherein (a) shows the measured values of blood glucose values, and (b) shows the measured values of insulin. In the drawing, the mark indicates the case with a solution of glucose alone, the mark Δ indicates the case with a solution of glucose and PF, and the mark ● indicates the case with a solution of glucose and PF-C. The mentioned PF-C and PF are defined as follows:

PF-C: a substance obtained by a process wherein pyrodextrin is hydrolyzed with α-amylase and glucoamylase, then the glucose produced thereby is excluded by column chromatography method.

PF: a substance obtained by a process wherein pyrodextrin is hydrolyzed with α-amylase, then refined by decolorization with activated charcoal and dealt with ion-exchange resin. From the results shown in FIG. 1, total sum (ΣBG, ΣIRI and ΣIRI/ΣBG) of the blood glucose values and insulin values at each measurement point were calculated respectively as shown in Table 1.

TABLE 1

The Results of GTT (mean ± SD) on Healthy Rats (SD descent, 8-week old, male)

|  | Load with glucose alone | Load with glucose + PF-C | Load with glucose + PF |
|---|---|---|---|
| n | 7 | 7 | 4 |
| ΣBG | 784.2 ± 68.8 | 754.1 ± 49.8 NS | 821.5 ± 41.2 NS |
| ΣIRI | 254.5 ± 49.8 | 177.3 ± 49.8 $p < 0.02$ | 194.2 ± 36.0 $p < 0.10$ |
| ΣIRI /ΣBG | 0.33 ± 0.07 | 0.23 ± 0.05 $p < 0.02$ | 0.24 ± 0.05 $p < 0.05$ |

As is understood from FIG. 1 and Table 1, the blood glucose values and ΣBG at each measurement point exhibited no difference to be noted between the load groups of glucose alone and glucose +PF-C. On the other hand, the insulin values in the administrative group of glucose +PF and glucose +PF-C were conspicuously lower than those in the administrative group of glucose alone. Furthermore, significant decreases in ΣIRI and ΣIRI/ΣBG were recognized.

Figure 2:
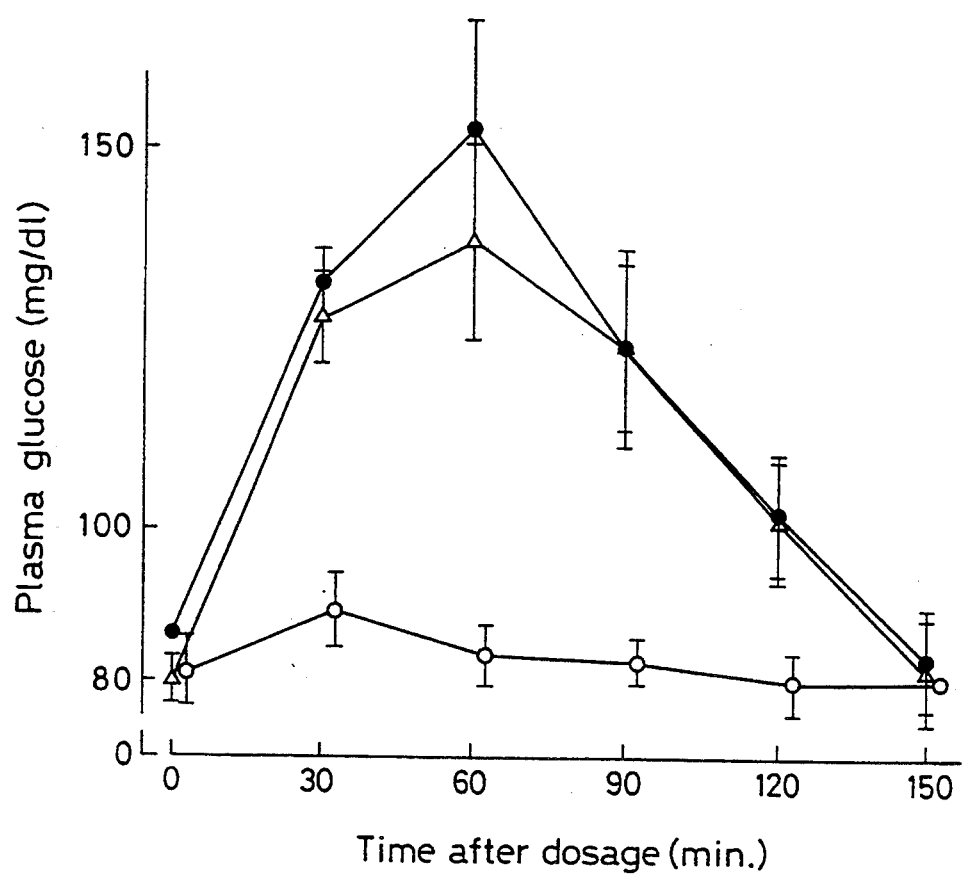
FIG. 2 is a graph showing the results of measuring blood glucose values.

EXAMPLE 2:

Six healthy adult men were employed as samples. After being subject to a fast for 24 hours, 50 g of glucose alone, 50 g of glucose and 20 g of PF-C, or 20 g of PF-C alone were given orally to them respectively, then blood was collected from the samples with the lapse of time, and the blood glucose levels thereof were measured, while insulin value was measured by RIA method. The results of measurement are shown in FIG. 2 on the blood glucose values and in FIG. 3 on the insulin values. ΣBG, ΣIRI and ΣIRI/ΣBG are shown in Table 2.

TABLE 2

The Results of GTT (mean ± SD) on Healthy Adult Men

|  | Administration with glucose alone | Administration with glucose + PF-C |
|---|---|---|
| n | 6 | 6 |
| ΣBG | 658.8 ± 100.3 | 648.6 ± 107.8 NS |
| ΣIRI | 136.5 ± 48.3 | 90.5 ± 17.8 NS ($p < 0.10$) |
| ΣIRI /ΣBG | 0.20 ± 0.05 | 0.14 ± 0.02 NS ($p < 0.05$) |

Figure 3:
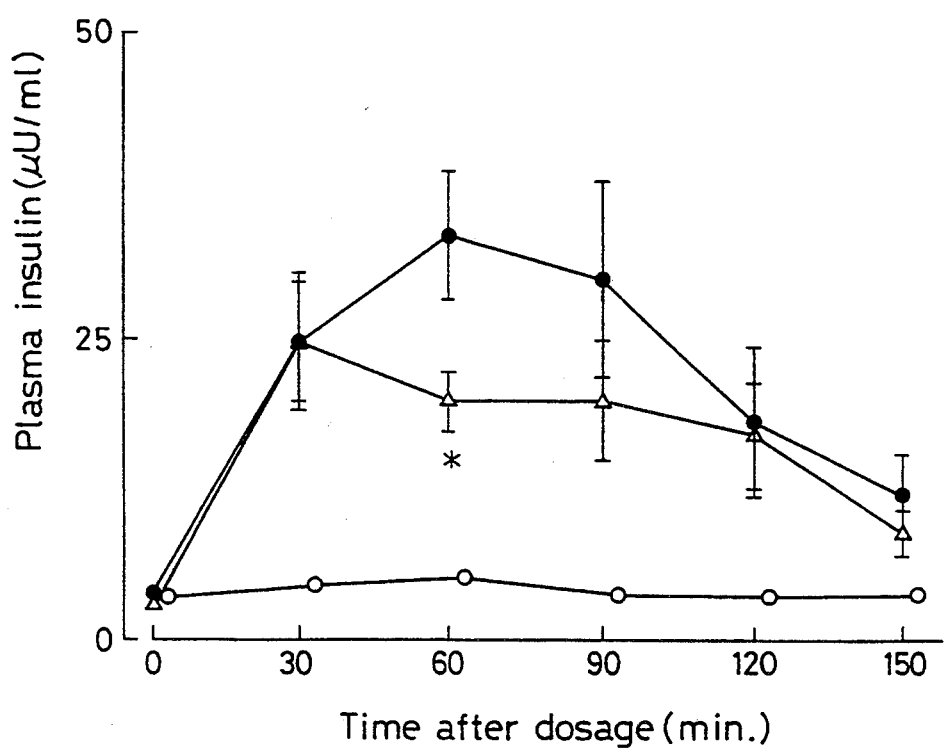
FIG. 3 is a graph showing the results of measuring insulin values.

In FIGS. 2 and 3, the mark ● indicates the case of glucose alone, the mark Ω indicates the case of 20 g of PF-C, and the mark Δ indicates the case of 50 g of glucose and 20 g of PF-C.

As is understood from FIG. 2, PF-C did not affect on the blood glucose values by itself. Also, the increase of blood glucose by the simultaneous dosage of glucose and PF-C did not show any difference from that by the single dosage of glucose.

As is understood from FIG. 3, the single dosage of PF-C did not bring about insulin secretion, either.

Further, insulin secretion by the simultaneous dosage of glucose and PF-C did show a significant drop within 60 minutes as compared with that by the single dosage of glucose. Furthermore, as is understood from Table 2, ΣBG did not show any difference in both load group of the single dosage of glucose and the group of the simultaneous dosage of glucose and PF-C, while ΣIRI showed a declining tendency in the latter. In addition, ΣIRI/ΣBG, which was calculated as an index of the change in insulin amount corresponding to the change in blood glucose per unit amount, did show a meaningful lowering in the latter.

The invention may be embodied in other specific forms without departing from the spirit or essential characteristics thereof. The foregoing examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for reducing insulin secretion without negatively affecting/influencing blood glucose levels in an animal which comprises the steps of:
   (a) providing a pyrodextrin hydrolysate which is obtained by heating starch in the presence of a mineral acid and in the presence of water in an amount of not more than about 5% based on the weight of the starch to prepare pyrodextrin, hydrolyzing the pyrodextrin with alpha-amylase and refining the hydrolyzed pyrodextrin; and
   (b) orally administering an effective amount of the pyro-dextrin hydrolysate to the animal.

2. The method of claim 1, wherein said pyrodextrin hydrolysate contains 1→4, 1→6, 1→2 and 1→3 glucosidic linkages and some of the reducing terminal groups of said pyrodextrin hydrolysate are 1→6 anhydroglucose groups.

3. The method of claim 1, wherein said pyrodextrin hydrolysate is obtained by heating said starch in the presence of hydrochloric acid in an amount of 0.01 to 0.1% by weight based on the weight of said starch at about 130° C. to 220° C. for 1 to 5 hours to prepare pyrodextrin, dissolving the pyrodextrin in water in an amount of 30 to 50% by weight based on the weight of the solution, adjusting the pH of the solution to pH 5.5 to 6.5, treating the solution with alpha-amylase in an amount of 0.05 to 0.2% by weight based on the weight of the pyrodextrin at 85° C. to 100° C. for 0.5 to 2 hours, and refining the hydrolyzed pyrodextrin.

4. The method of claim 1, wherein said animal is a human being.

5. The method of claim 4 wherein said pyrodextrin hydrolysate is administered in the form of food containing the same.

6. A method for reducing insulin secretion without negatively affecting/influencing blood glucose levels in an animal which comprises the steps of:
   (a) providing a pyrodextrin hydrolysate which is obtained by heating starch in the presence of a mineral acid and in the presence of water in an amount of not more than about 5% based on the weight of the starch to prepare pyrodextrin, hydrolyzing the pyrodextrin with alpha-amylase and then with glucoamylase, and subjecting the hydrolyzed dextrin to ion exchange resin chromatography to refine the hydrolyzed pyrodextrin; and (b) orally administering an effective amount of the pyro-dextrin hydrolysate to the animal.

7. The method of claim 6, wherein said pyrodextrin hydrolysate contains 1→4, 1→6, 1→2 and 1→3 linkages and some of the reducing terminal groups of said pyrodextrin hydrolysate are 1→6 anhydroglucose groups.

8. The method of claim 6, wherein said pyrodextrin hydrolysate is obtained by heating said starch in the presence of hydrochloric acid in an amount of 0.01 to 0.1% by weight based on the weight of said starch at about 130° C. to 220° C. for 1 to 5 hours to prepare pyrodextrin, dissolving the pyrodextrin in water in an amount of 30 to 50% by weight based on the weight of the solution, adjusting the pH of the solution to pH 5.5 to 6.5, treating the solution with alpha-amylase in an amount of 0.05 to 0.2% by weight based on the weight of the pyrodextrin at 85° C. to 100° C. for 0.5 to 2 hours, treating the solution with glucoamylase in an amount of 0.05 to 0.2% by weight based on the weight of the pyrodextrin at about 55° C. for 24 to 48 hours, refining the hydrolyzed pyrodextrin and subjecting the hydrolyzed and refined pyrodextrin to ion exchange resin chromatography to separate said pyrodextrin hydrolysate.

9. The method of claim 8, wherein said ion exchange resin is an alkaline metal or alkaline earth metal strongly acidic ion exchange resin.

10. The method of claim 6, wherein said animal is a human being.

11. The method of claim 10, wherein said pyrodextrin hydrolysate is administered in the form of food containing the same.

* * * * *